United States Patent [19]

Kirkland

[11] 4,014,023
[45] Mar. 22, 1977

[54] BEAM FORMER UTILIZING GEOMETRIC SAMPLING

[75] Inventor: Robert E. Kirkland, Barrington, R.I.

[73] Assignee: Raytheon Company, Lexington, Mass.

[22] Filed: May 14, 1975

[21] Appl. No.: 577,366

[52] U.S. Cl. .......................... 343/100 SA; 340/6 R; 340/347 AD; 343/113 R

[51] Int. Cl.² ................. H01Q 3/26; G01S 3/80; H03K 13/02

[58] Field of Search ............... 340/347 AD, 6 R; 343/100 SA, 113 R

[56] References Cited
UNITED STATES PATENTS

| 3,370,267 | 2/1968 | Barry | 343/100 SA |
| 3,678,505 | 7/1972 | Mostyn | 340/347 AD |
| 3,686,665 | 8/1972 | Elias et al. | 340/347 AD |
| 3,697,994 | 10/1972 | O'Daniel | 343/100 SA |

Primary Examiner—Maynard R. Wilbur
Assistant Examiner—Richard E. Berger
Attorney, Agent, or Firm—David M. Warren; Joseph D. Pannone; Milton D. Bartlett

[57] ABSTRACT

Samples of signals received by elements responsive to incident radiation, such as an array of sonar transducers, are obtained as exponents of the base two by a successive approximation register and decoder coupled together in a feedback loop by a comparator and a digital-to-analog converter. Weighting of samples from the individual transducers is obtained by adding scaling exponents to the sample exponents. Combining of samples to form a beam of received radiation is accomplished by summing together the antilogarithms of selected weighted samples.

16 Claims, 3 Drawing Figures

BEAM FORMER UTILIZING GEOMETRIC SAMPLING

BACKGROUND OF THE INVENTION

Arrays of elements for receiving radiant energy such as an antenna array for radar or an array of transducers for sonar, are utilized in conjunction with electrical circuitry for forming receiving beams for locating sources of such radiant energy. Radiant energy signals propagating towards the array of receiving elements experience wide ranges in dynamic range of their amplitudes depending on the strengths of the sources and their distances from the receiving elements. The electrical circuitry utilized in forming the receiving beam often includes digital sampling circuits which need be responsive to the wide variations in amplitude, as well as multiplying circuits for multiplying the signals of the respective receiving elements by shading coefficients to more accurately generate a prescribed form to the directivity pattern of a receiving beam.

A problem arises in that the generation of a plurality of receiving beams necessitates the storing of past histories of data samples from the signals of the respective receiving elements. In the case of signals having a wide dynamic range, far more bits of digital samples need be stored than for a signal of fixed amplitude. While automatic gain control is frequently utilized in the amplification of the received signals to reduce the dynamic range, such control may be difficult or impossible to implement in situations involving fast fading along the path of signal propagation and sudden changes in multipath echoes as may be produced in the sonar situation by sonic reverberations. In addition, digital multiplication to accomplish the aforementioned shading may be unduly cumbersome in those situations where the number of bits in each digital sample presented to the multiplier are far in excess of those required to form a beam under the circumstances of substantially constant signal strength.

SUMMARY OF THE INVENTION

The aforementioned problems are overcome and other advantages are provided by a beam former system which, in accordance with the invention, utilizes geometric sampling of the data of the signals provided by the respective receiving elements. While the teachings of this invention are applicable to both signals of electromagnetic energy or sonic energy, the invention has been found to be particularly useful in sonar applications and, accordingly, the invention will be taught by reference to an array of sonar transducers and electrical circuitry coupled thereto which utilizes geometric sampling for forming beams of sonic energy. With geometric sampling, each digital number representing the magnitude of a sample of the sonar signal is in the form of an exponent or logarithm to the base two of the actual magnitude of the data sample. In this way, a digital signal comprised of a relatively small number of bits can represent a wide range of sonar signal amplitudes. This greatly reduces the storage requirements for use in the beam forming operation. It also facilitates the shading of the signals from each of the transducers since the multiplication process can now be accomplished by the addition of the logarithm of a scaling factor to the logarithm of the sonar signal amplitude. The combining of the shaded or weighted signals is accomplished by first extracting the antilogarithm of the signals to obtain the true weighted amplitudes thereof after which the weighted amplitudes are summed together to provide the receiving beam.

The geometric sampling is obtained by means of a feedback loop employing a comparator coupled between a reference signal and the signal received by a transducer. The reference signal is obtained from a digital-to-analog converter coupled via a decoder to a successive approximation register which, in turn, is driven by the output of the comparator. The decoder, in response to a digital number from the successive approximation register, energizes only one bit at a time of the digital input to the digital-to-analog converter thereby providing analog outputs for the reference signal which are related to each other by factors of two. As a consequence of this relationship of factors of two, the digital number at the output of the successive approximation register is therefore the logarithm to the base two of the transducer signal applied to the comparator.

In one embodiment of the invention, a selector switch is coupled between the decoder and the digital-to-analog converter for selectively switching a set of lines from the decoder to one of a plurality of corresponding sets of input terminals of the digital-to-analog converter. One of these sets of input terminals represents signals of relatively low amplitude, while a second of these sets of input terminals represents a signal of a relatively large amplitude. This provides a multiple range of logarithmic signals permitting the use of a logarithm having relatively few digits to represent a wide dynamic range signal. In a second embodiment of the invention, a decoder is coupled to a pair of digital-to-analog converters wherein one of the converters represents large amplitude signals while the other converter represents small amplitude signals, the outputs of the two converters being connected to a summer which sums the outputs together to provide the reference for the comparator. The digital-to-analog converter operating with the larger amplitude signal is decoupled from the summer when a small amplitude signal is present to improve the accuracy of the reference.

BRIEF DESCRIPTION OF THE DRAWINGS

The aforementioned aspects and other features of the invention are explained in the following description taken in connection with the accompanying drawings wherein.

DESCRIPTION OF THE PREFERRED EMBODIMENT

Figure 1:
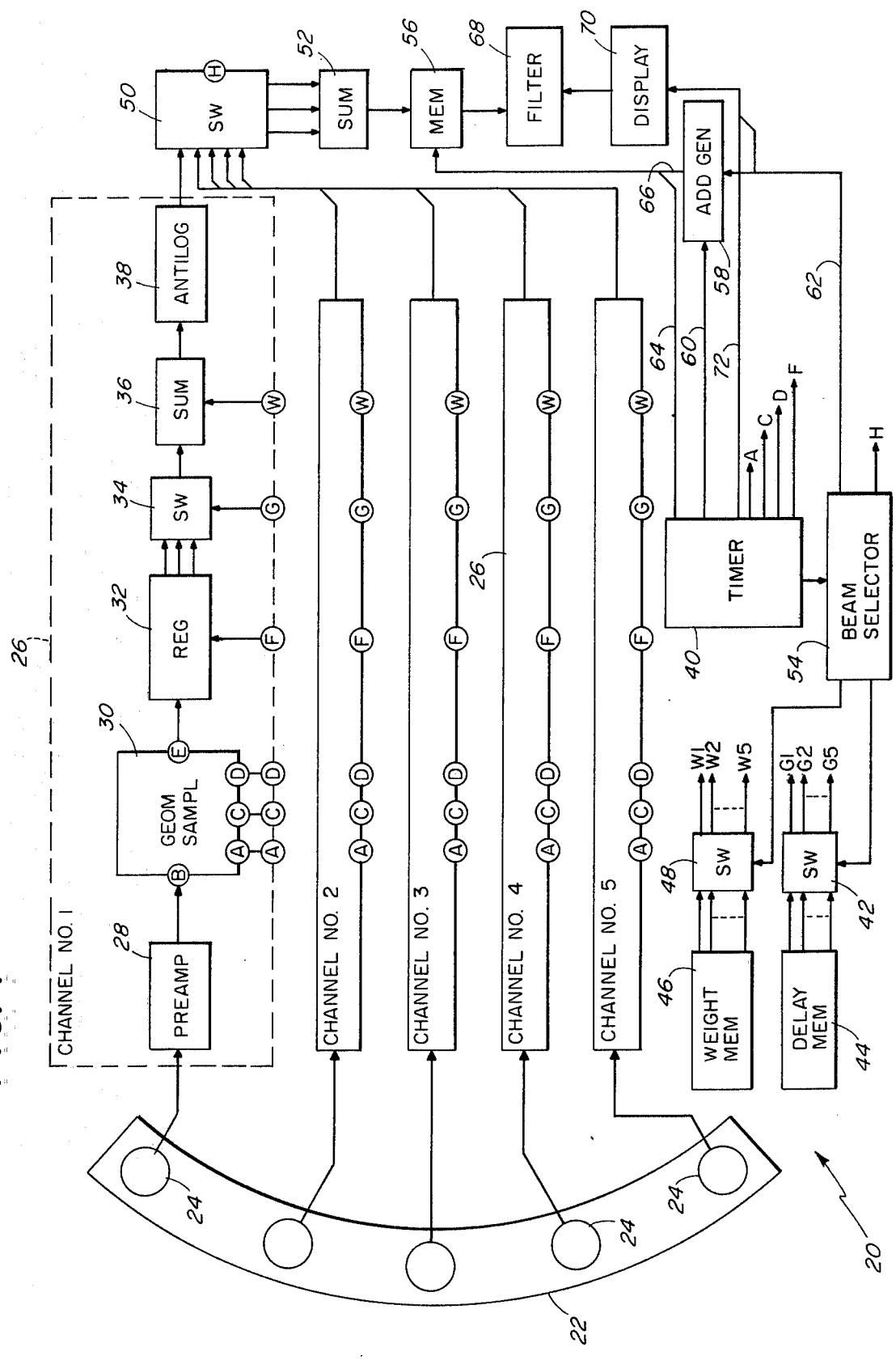
FIG. 1 is a block diagram of a sonar beam former incorporating geometric sampling in accordance with the invention.

Referring now to FIG. 1, there is seen a block diagram of a system 20 including an array 22 of transducers 24 for receiving sonic energy incident thereupon. Five of the transducers 24 are shown in the array 22 by way of example for teaching the invention, it being understood that the array 22 may comprise additional transducers in the form of a line array or, for example, along a curved surface as in a cylindrical array. In accordance with the invention, each of the transducers 24 is coupled to a receiving channel 26 comprising a preamplifier 28, a geometric sampler 30, a register 32 for storing a history of samples provided by the geometric sampler 30, a switch 34 for selecting specific ones of the stored samples, a summer 36 for shading the selected samples by a summation of logarithms, and an antilog unit 38 having electrical circuitry for converting the logarithmic representation of the sampled data to the true value of the sampled data.

Each of the channels 26 is further identified by the numerals 1 through 5 and is portrayed with terminals A, C and D which are coupled to correspondingly identified terminals of the geometric sampler 30, each channel 26 also having a terminal F coupled to the register 32, a terminal G coupled to the switch 34 and a terminal W coupled to the summer 36. The terminals A, C, D and F are coupled to a timer 40 for providing timing signals to operate the geometric sampler 30 and the register 32. The terminals G of the channels 26 are coupled to respectively numbered terminals of a switch 42 having its terminals correspondingly numbered G1–G5, the switch 42 selecting command signals for the switches 34 from a memory 44. The memory 44 stores signals representing amounts of delay in the past history of signals from each of the transducers 24, the amounts of delay being in accordance with the angle of incidence to the array 22 of an incident beam of sonic energy. The system 20 also comprises a memory 46 which stores the logarithms of weighting coefficients which are coupled via a switch 48 to the terminals W in the respective channels 26 for accomplishing a shading of the receiving beam.

The outputs of the channels 26 are coupled via a switch 50 which selects signals from specific ones of the channels 26 to be summed together by a summer 52. A beam selector 54 responsive to timing signals from the timer 40 provides switch control signals to the switches 42 and 48 and also a switch control signal via terminal H to the switch 50. Each signal appearing at the output of the summer 52 is a sample of a receiving beam, the specific beam being determined by the switch 50 and the switches 34. The samples from each of the beams are then stored in specific locations within a memory 56, these locations being designated by an address generator 58 driven by signals along lines 60 and 62 respectively from the timer 40 and the beam selector 54. In response to timing signals along line 64 from the timer 40 and address signals along line 66 from the address generator 58, the stored samples for each of the beams are coupled from memory 56 into a filter 68 which blends the samples of each beam into an analog signal for presentation upon a display 70. Timing signals from the timer 40 along line 72 as well as the signal from the beam selector 54 on line 62 are coupled to the display 70 for synchronizing the presentation of data thereupon for the operation of the memory 56.

A system similar to the system 20 is described in greater detail in a copending United States patent application entitled "Electronically Stabilized Beam Former System" having Ser. No. 546,373 and filed in the name of A. H. Kits van Heyningen on Feb. 3, 1975, that application disclosing a cylindrical array with a shift register and selector switch coupled to each transducer element of the array in a manner analogous to that disclosed by the register 32 and the switch 34 of FIG. 1 of the present application. The aforementioned application of Kits van Heyningen also shows, in its FIG. 6, the combination of signals from selected transducers of a row of the array and the combination of the signals from a plurality of rows to provide steering of a beam in both azimuth and elevation. To facilitate the explanation of the geometric sampling of the present invention in a beam forming system, the system 20 of FIG. 1 shows an array 22 capable of steering a beam only in an azimuth sector, it being understood that the teachings of the aforementioned Kits van Heyningen application may be utilized in building a system incorporating the present invention for steering a beam in both elevation and azimuth.

In operation, therefore, the signal of each transducer 24 is processed by its corresponding channel 26 to present it in a form suitable for summation by the summer 52 with the signals of other ones of the transducers 24. In each channel 26, the preamplifier 28 amplifies the power of the transducer signal to a suitable magnitude to be sampled by the sampler 30. The sampler 30 is clocked by the timer 40 to take samples at a rate at least as fast as the Nyquist rate for data carried by the transducer signal. The samples are then clocked by the timer 40 from the sampler 30 into the register 32 which has sufficient storage capacity to store the number of samples which occur during the interval of time required for a wave of sonic energy to propagate past the array 22. In each of the channels 26, samples in the respective registers 32 having differing delays are extracted by the corresponding switches 34 in accordance with the beam forming teachings of the U.S. Pat. No. 3,370,267 entitled "Beam Forming System" which issued in the name of H. J. Barry on Feb. 20, 1968. The appropriate selection signals are applied to terminal G in each of the channels 26 in accordance with the specific beam selected by the beam selector 54 with the set of command signals for terminals G1–G5 being coupled from the memory 54 via the switch 42. Such a set of switch control signals for selecting samples of the appropriate delays is also disclosed in the aforementioned patent application of Kits van Heyningen.

The weighting of the sample transducer signals is accomplished in each channel 26 by the summer 36. The weighting of signals in an analog system is disclosed in the book entitled "Radar Handbook" by M. I. Skolnik published by McGraw-Hill Book Company in 1970 in FIG. 39 of Chapter 11. In the case of an analog system, weighting can be accomplished by the use of variable resistors which introduce a multiplicative factor to each signal. In a digital system a weighting is accomplished by multiplying a digital number representing the magnitude of a signal sample by a second digital number which is a scaling or weighting factor. In the system of FIG. 1, the geometric sampler 30 provides a digital number which represents the logarithm to the base two of the amplitude of a signal sample and, accordingly, the weighting is accomplished simply by summing together the logarithmic representation of the signal sample with the logarithm of the weighting factor. These logarithms, or exponents, are stored in the memory 46 and are selectively coupled by the switch 48 in response to commands from the beam selector 54 to the terminals W1–W5 to the summers 36 of the respective channels 26. The outputs of the respective summers 36 are thus seen to be the magnitudes of weighted signal samples in logarithmic or exponential digital notation. Due to the fact that these logarithms are to the base two, the binary digital numbers appearing at the output of the summer 36 are readily converted by the antilogarithmic unit 38 to numbers representing the true amplitude of each signal sample. As an example in the simplicity of the inverse logarithmic conversion, the binary number 100 represents the numeral 2 raised to the fourth power which is equal to 16. The inverse logarithmic operation of obtaining the binary representation for the number 16 is accomplished by simply shifting the 1 two places to the left. Thus, it is seen that the individual transducer signals are readily weighted to provide a desired shape to the receiving beam and to reduce the level of sidelobes.

To facilitate the explanation of the system 20, it is assumed that the display 70 includes a long persistence oscilloscope in which analog data for signals in each of the beams can be sequentially presented, the persistence of the display being long enough so that a complete picture of the region of space scanned by the receiving beams can be presented. Accordingly, the sets of digital samples of the various beams which are stored in the memory 56 are smoothed by the filter 68 to remove the sampling frequency and are then sequentially presented upon the display 70 in response to the timing signals on lines 72 and 62. The bandwidth of the filter 68 is sufficiently broad to pass the spectrum of the data of the transducer signals while being sufficiently narrow to exclude unwanted noise. It is understood that other forms of displays and filters may be utilized, for example, a digital filter in lieu of the analog filter 68 to enhance the signal-to-noise ratio.

It is also noted that the use of the logarithmic representation of the transducer signal samples greatly reduces the storage requirements of the register 32. For example, if the register 32 is a shift register clocked by pulses at terminal F, with each cell of the shift register being a multistage cell with each stage storing one digit of the binary number stored in each cell, then, for example, a three digit binary number 111 representing the logarithm of the decimal number 128 may be stored in a three-stage cell rather than the eight digit binary number 10000000 representing the decimal number 128. The three digit binary number approximates the amplitude of the transducer signal sample by eight possible states of quantization of the transducer signal sample; such sampling has far greater accuracy than the one bit sampling provided by hard limiting that is frequently done in sonar signal sampling.

Figure 2:
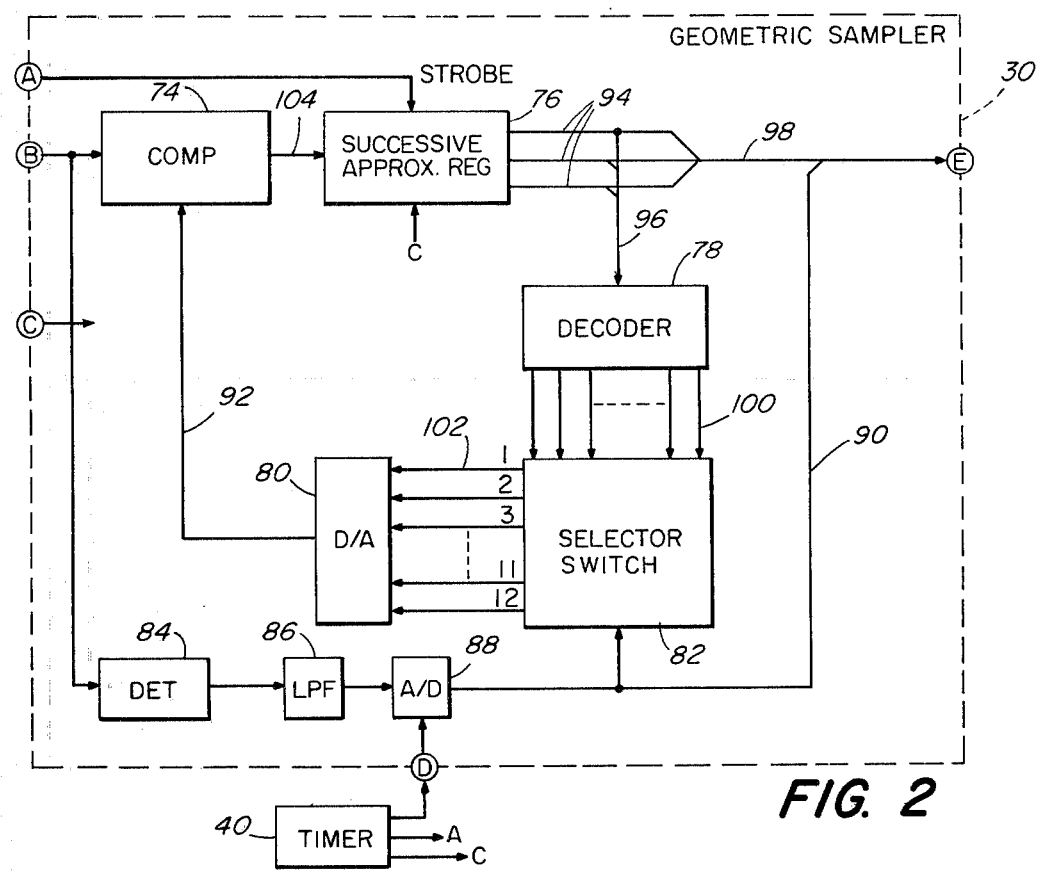
FIG. 2 is a block diagram of one embodiment of the geometric sampler of FIG. 1 showing the use of a selector switch between the decoder and the digital-to-analog converter.

Referring now to FIG. 2, there is seen a block diagram of the geometric sampler 30 which comprises a comparator 74, a successive approximation register 76, a decoder 78, and a digital-to-analog converter hereinafter referred to as D/A 80 which is coupled to the decoder 78 by a switch 82. The sampler 30 further comprises a detector 84, a low pass filter 86 and an analog-to-digital converter hereinafter referred to as A/D 88 which is coupled by a terminal D to the timer 40 and provides a signal on line 90 for controlling the switch 82. Also seen in the figure are the terminals A, B, C and E which were previously seen in FIG. 1. The comparator 74 is coupled to terminal B for receiving signals from the preamplifier 28 of FIG. 1 and is also coupled via line 92 to the D/A 80 which provides an analog reference voltage on line 92 to be compared against the transducer signal at terminal B. The output of the register 76 is a multidigit binary number with individual lines 94 representing individual digits, the lines 94 being shown as fanning into a cable 96 coupled to the input of the decoder 78 and a second cable 98 which also contains line 90 and is coupled to terminal E. The decoder 78 is shown having eight output lines 100 by which it is coupled to the switch 82, there being twelve lines 102 coupling the switch 82 to the input of the D/A 80.

In operation, therefore, the comparator 74 applies a logic level of 1 or 0 to the register 76 depending on the relative amplitudes of the signals at terminal B and on line 92. The successive approximation register 76 is a commercially available device, one such register being produced by Advanced Micro Devices bearing part number Am2502. The register 76 is responsive to the signal on line 104 from the comparator 74 to provide a digital number on the lines 94, the individual digits thereof being provided sequentially in response to individual ones of the clock pulses at terminal C. The first digit appearing on a line 94 is the most significant bit which activates the decoder 78 to energize a line 100 that activates the D/A 80 to provide a reference signal on line 92 having an amplitude which is mid-range in respect to the total range of magnitudes of reference signal available from the D/A 80. The signal on line 104 then signifies the amplitude relationship between the signal at terminal B and the signal on line 92, this information being utilized by logic circuits within the register 76 to alter the value of the most significant bit if necessary. For example, in the event that the signal at terminal B is greater than the reference signal on line 92, then the most significant bit on line 94 is high, a high voltage on line 92 indicating a logic state of 1 while a low voltage represents a logic state of 0. Assuming, for example, that the amplitude of the signal at terminal B is greater than half the maximum possible reference signal but less than threequarters the maximum possible reference signal, the second digit to appear on a line 94 is also high, so that, in the case of a three digit output from the register 76, the most significant bit and the middle bit are both 1's. Accordingly, the sixth line of the output lines 100 from the decoder 78 is energized. The sixth line is coupled via the switch 82 to the sixth line of the lines 102 to the D/A 80 which causes the reference signal on line 92 to have a magnitude equal to three-quarters of the maximum possible magnitude. The comparator 74 then signals the register 76 that the reference signal is greater than the signal at terminal B with the result that the output of the register 76 changes to the binary number 101, this activating the fifth line of the lines 100. After all of the digits on the lines 94 have been provided by the register 76, the register 76 automatically terminates its operation and retains the final digital number on the lines 94 until the register 76 is again strobed by the signal at terminal A.

The signal at terminal A is clocked by the timer 40 at the system sampling rate with the clock pulses at terminal C being provided at a much higher rate to complete the operation of the register 76 in an interval of time which is smaller than the interval between successive samples of the signal from the preamplifier 28 of FIG. 1. The timing pulses at terminal F of FIG. 1 are clocked at the same rate as are the strobe signals of terminal A but are delayed therefrom by an amount of time sufficient to insure completion of the operation of the register 76. Also, the signals at terminals G and W of FIG. 1 are updated at the system sampling rate and are synchronized with the same time frame as the signals at the terminals A, C and F by means of the timer 40.

The switch 82 of FIG. 2 couples the lines 100 to the first eight lines of the lines 102 or, alternatively, couples the lines 100 to the lines 5 through 12 of the lines 102, this operation of the switch 82 depending on whether the signal on line 90 is high or low. When the lines 1 through 8 of the lines 102 are utilized, the maximum amplitude of the reference signal on line 92 occurs when the eighth line of the lines 102 is energized. When the lines 5–12 of the lines 102 are utilized, the maximum amplitude of the reference signal on line 92 is increased by a factor of two raised by the fourth power, or sixteen. Thus, it is seen that the use of the switch 82 permits the sampler 30 to operate in a low range or high range of reference signal on line 92 to accommodate transducer signals at terminal B in a low range of values, for example, from one millivolt to 128 millivolts or in a high range from 16 millivolts to 2048 millivolts. The high range or low range is indicated by the high or low voltage on line 90, the line 90 joining the cable 98 to serve as one more bit of the binary number stored in the register 32 of FIG. 1, this bit being passed on to the summer 36 and the antilogarithmic unit 38 to indicate the high or low range for enabling the mathematical computations of the summer 36 and the antilogarithmic unit 38.

It is noted that each line 100 couples a separate digit of the binary number applied to the input of the D/A 80. Since only one of the lines 100 is high at any one time, there are only eight different possible digital numbers, one of which is presented to the D/A 80. In the low range these numbers are 1, 10, 100, with the eighth number being the numeral 1 followed by seven 0's. In the high range the eight possible numbers are the numeral 1 followed by four 0's, the numeral 1 followed by five 0's, up to the numeral 1 followed by eleven 0's. Each number is double the preceding number and, accordingly, the sampler 30 is referred to as a geometric sampler. The digital number appearing on the lines 94 indicates the number of 0's following the 1 on the lines 100 and, thus, is seen to be the logarithm to the base two of the number represented by the lines 100.

The detector 84 senses the amplitude of the transducer signal at terminal B for operating the switch 82 to switch from the low range to the high range. Amplitude fluctuations sensed by the detector 84 are smoothed by the low pass filter 86 to give an average value of the amplitude of the transducer signal, the average value being presented to the A/D 88. The A/D 88 is a one bit analog-to-digital converter which may be, for example, a gated comparator having a voltage reference to be compared with the output of the filter 86. When the output of the filter 86 exceeds the reference, the signal on line 90 is high. The A/D 88 is triggered by a timing signal provided by the timer 40 via terminal D. The timing signal at terminal D may be provided at the same rate or at a lower rate than the system sampling signal of terminal A, however, each timing signal at terminal D immediately precedes the strobing of the register 76 by the signal at terminal A. In this way, the switching of the switch 82 is accomplished prior to the operation of the register 76.

Figure 3:
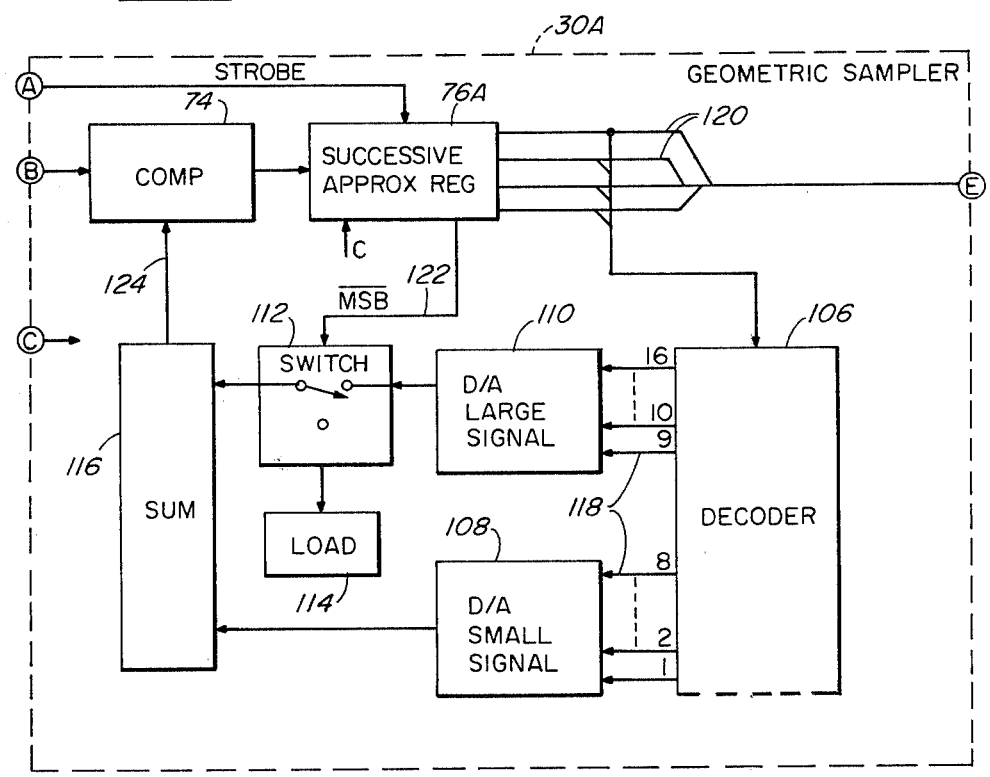
FIG. 3 is a block diagram of an alternative embodiment of the geometric sampler of FIG. 1 in which two digital-to-analog converters are coupled between the decoder and the comparator.

Referring now to FIG. 3, there is seen an alternative embodiment of the geometric sampler, this embodiment being identified by the legend 30A. The sampler 30A comprises the comparator 74, previously seen in FIG. 2, a register 76A which is similar to the register 76 of FIG. 2 but has a four-line output, a decoder 106 similar to the decoder 78 of FIG. 2 but having a four-line input and a sixteen-line output, two digital-to-analog converters referred to hereinafter as D/A 108 and D/A 110, a switch 112, a load 114 having an impedance equal to the output impedance of D/A 110, and a summer 116. The sampler 30A demonstrates the use of two digital-to-analog converters, one converter, D/A 108, being utilized for providing a reference to the comparator 74 for small values of the transducer signal at terminal B while the second converter, D/A 110, is utilized for large values of the transducer signal at terminal B. One of the sixteen lines 118 assumes a high value as designated by the four-digit number on lines 120 from the register 76A. The register 76A also provides an output on line 122 which is the complement of the most significant bit of the digital number appearing on the lines 120. The signal on line 122 operates the switch 112 to decouple the D/A 110 from the summer 116 when small values of the transducer signal at terminal B are present thereby increasing the accuracy of the reference signal provided on line 124 to the comparator 74.

The operation of the geometric sampler 30A is similar to that of the sampler 30 of FIG. 2 when the selector switch 82 is set in the low range. The signals at terminals A, B and C provide the same functions in the sampler 30A as they do in the sampler 30. The signal at terminal E of the sampler 30A is utilized in the same manner as the signal at terminal E of the sampler 30 except for the fact that the sampler 30A utilizes a four bit digital number at terminal E while the sampler 30 provides at terminal E a three bit digital number plus a fourth digit which represents the position of the switch 82. For large amplitude signals, the analog outputs of D/A 110 and of D/A 108 are summed together by the summer 116 to provide the reference 124. For low values of transducer signal, when the D/A 110 is decoupled from the summer 116 by the switch 112, the load 114 is coupled by the switch 112 to the summer 116 to substitute the same value of impedance as that presented by the D/A 110 so that the value of analog signal provided by the D/A 108 is not altered by the operation of the switch 112. Thereby, the D/A 108 may utilize circuitry adapted for small signals to provide a highly accurate reference which is unaffected by output signals of the D/A 110 when the latter is switched out of the circuit.

It is understood that the above-described embodiments are illustrative only and that modifications thereof may occur to those skilled in the art. Accordingly, it is desired that this invention is not to be limited to the embodiment disclosed herein but is to be limited only as defined by the appended claims.

What is claimed is:

1. A system for geometrically sampling a radiant energy signal comprising:
   an array of receiving elements;
   a plurality of samplers, individual ones of said samplers being coupled to respective ones of said receiving elements, each of said samplers comprising:
   a reference signal means;
   a comparator for comparing a signal provided by one of said receiving elements with a reference signal of said reference signal means; and
   means coupled between said comparator and said reference means for varying the value of said reference signal, said value varying means comprising decoder means having an output terminal coupled to said reference signal means, said output terminal of said decoder means scaling the amplitude of said reference signal by an exponential factor, the exponent of said factor being provided by an input terminal of said decoder means, whereby a signal at said decoder input terminal is a logarithmic representation of the amplitude of a sample of said radiant energy signal.

2. A system according to claim 1 further comprising means coupled to said plurality of samplers for summing with said logarithmic representations of respective ones of said samples the logarithms of respective ones of a plurality of weighting factors for shaping a beam of radiant energy.

3. A system according to claim 2 further comprising means coupled to said summing means for combining said logarithmic sums of the sample representations and the weighting factors to form said beam of radiant energy.

4. A system according to claim 3 wherein said combining means includes means for forming the inverse logarithmic representation of each of said logarithmic summations of the sample representations and the weighting factors.

5. A system according to claim 4 further comprising means for delaying respective ones of said logarithmic sample representations by predetermined values of delay to form beams of said radiant energy in a plurality of directions, and wherein said combining means including means coupled to said delay means for storing sets of samples of each of said plurality of beams of radiant energy.

6. A system according to claim 1 wherein said varying means comprises a successive approximation register coupled between said comparator and said decoder means.

7. A system according to claim 6 wherein said reference signal means comprises a digital-to-analog converter coupled between said decoder means and said comparator, an output signal of said digital-to-analog converter serving as said reference signal for said comparator.

8. A system according to claim 7 wherein said varying means further comprises a selector switch coupled between said decoder means and said digital-to-analog converter, said decoder means having a plurality of lines coupled between said decoder means and said selector switch for communicating said decoder output signal to said selector switch, said digital-to-analog converter having a plurality of input lines of greater number than the number of said plurality of output lines of said decoder means, said selector switch selectively coupling said plurality of output lines of said decoder means to an equal number of input lines of said plurality of input lines of said digital-to-analog converter to vary the logarithmic range of values of said reference.

9. A system according to claim 8 further comprising means responsive to an average value of signals received by said receiving elements for operating said selector switch to provide a range of values for said reference.

10. A system according to claim 6 wherein said varying means further comprises a first and a second digital-to-analog converter coupled between said comparator and said decoder means for providing respectively small and large values of reference signal, and means for summing together the reference signal output of each of said digital-to-analog converters to provide said reference signal to said comparator.

11. A system according to claim 10 further comprising means coupled between said summing means and said second digital-to-analog converter for decoupling said second digital-to-analog converter from said summing means for relatively low values of signals provided by said receiving elements.

12. In combination:
means for comparing a reference signal to an input signal;
means coupled to said comparing means for designating a sequence of digital numbers in accordance with a sequence of output signals from said comparing means;
decoder means having a plurality of output lines and having its input coupled to said number designating means, said decoder means being responsive to one of said digital numbers for activating only one of its output lines; and
means coupled between said output lines of said decoder means and said comparing means for converting a digital number represented by said output lines of said decoding means to said reference signal, said reference signal being an analog type signal.

13. A combination according to claim 12 wherein said number designating means is a successive approximation register, said digital numbers of said number designating means being a logarithmic representation of the amplitude of a sample of said input signal.

14. A combination according to claim 13 further comprising a selector switch coupled between said decoder means and said converting means, said converting means having a plurality of input terminals of greater number than the number of said output lines of said decoder means, said selector switch selectively coupling said plurality of output lines of said decoder means to an equal number of said input terminals of said converter means to vary the logarithmic range of values of said reference.

15. A combination according to claim 13 wherein said converting means comprises a plurality of digital-to-analog converters and means for summing together the output signals of said plurality of digital-to-analog converters, the output signal of said summing means being said reference signal.

16. A combination according to claim 15 further comprising a load of impedance equal to the output impedance of one of said digital-to-analog converters, and means coupled between said summing means and one of said digital-to-analog converters for decoupling said one digital-to-analog converter from said summing means and coupling said load to said summing means in place of said one digital-to-analog converter.

* * * * *